(12) United States Patent
Mokuo et al.

(10) Patent No.: US 11,420,834 B2
(45) Date of Patent: Aug. 23, 2022

(54) MEDIUM TRANSPORT APPARATUS AND IMAGE READING APPARATUS

(71) Applicant: SEIKO EPSON CORPORATION, Tokyo (JP)

(72) Inventors: Tomoyuki Mokuo, Kitakyushu (JP); Keiichiro Fukumasu, Kitakyushu (JP); Shinsuke Kogi, Kitakyushu (JP); Junichiro Higuma, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 170 days.

(21) Appl. No.: 16/828,624

(22) Filed: Mar. 24, 2020

(65) Prior Publication Data

US 2020/0307926 A1 Oct. 1, 2020

(30) Foreign Application Priority Data

Mar. 26, 2019 (JP) .............................. JP2019-058698

(51) Int. Cl.
*B65H 1/04* (2006.01)
(52) U.S. Cl.
CPC ......... *B65H 1/04* (2013.01); *B65H 2405/324* (2013.01); *B65H 2801/06* (2013.01)
(58) Field of Classification Search
CPC . B65H 1/04; B65H 2402/41; B65H 2405/324
See application file for complete search history.

(56) References Cited

U.S. PATENT DOCUMENTS

| 4,679,509 | A | * | 7/1987 | Sampson, Jr. | ......... A47B 23/04 108/27 |
| 7,543,805 | B2 | * | 6/2009 | Yoshie | .................... B42C 11/02 270/37 |
| 11,122,183 | B2 | * | 9/2021 | Anami | ............... H04N 1/00013 |
| 2007/0045920 | A1 | | 3/2007 | Yoshie et al. | |
| 2007/0188818 | A1 | * | 8/2007 | Westcott | ........... H04N 1/00583 358/296 |
| 2021/0155439 | A1 | * | 5/2021 | Namiki | .................... B65H 3/56 |

FOREIGN PATENT DOCUMENTS

| CN | 100398425 C | * | 7/2008 | .......... B32B 37/226 |
| JP | 2009-527143 | | 7/2009 | |

* cited by examiner

*Primary Examiner* — Howard J Sanders
(74) *Attorney, Agent, or Firm* — Workman Nydegger (57) ABSTRACT

A scanner is configured to include a rotating body at a bottom portion of an apparatus main body and to be switchable between a movable state in which the rotating body contacts an installation surface on which the apparatus main body is installed and the rotation of the rotating body enables the movement of the apparatus main body on the installation surface and an installation state in which a contact area of the bottom portion of the apparatus main body with respect to the installation surface is larger than the movable state and the apparatus main body is installed and used on the installation surface.

7 Claims, 12 Drawing Sheets

MEDIUM TRANSPORT APPARATUS AND IMAGE READING APPARATUS

The present application is based on, and claims priority from JP Application Serial Number 2019-058698, filed Mar. 26, 2019, the disclosure of which is hereby incorporated by reference herein in its entirety.

BACKGROUND

1. Technical Field

The present disclosure relates to a medium transport apparatus that transports a medium, and an image reading apparatus including the medium transport apparatus.

2. Related Art

Some scanners, which are examples of image reading apparatuses, automatically feed a plurality of media toward a reading portion by a medium transport apparatus and perform reading by the reading portion. As an example, JP-T-2009-527143 discloses a scanner including a reading portion that reads a medium transported by a medium transport apparatus. The medium transport apparatus may be provided in a recording apparatus including a recording portion that performs recording on a medium, that is, the recording apparatus may be configured to send a plurality of media toward the recording portion by the medium transport apparatus.

In some cases, an image reading apparatus or a recording apparatus including a medium transport apparatus is installed on a desk or a shelf. At this time, in order to change the installation position of the apparatus, the apparatus may be dragged to move on the installation surface of the desk or shelf, but such movement may damage the installation surface. If the entire apparatus is completely lifted and moved, the installation surface will not be damaged, but many image reading apparatuses and recording apparatuses are relatively heavy even if the apparatuses are small, and moving by lifting the apparatuses is not easy.

SUMMARY

According to an aspect of the present disclosure, there is provided a medium transport apparatus including a transport unit that is provided in a transport path along which a medium is transported, and a processing portion that performs predetermined processing on the medium transported along the transport path, and the medium transport apparatus includes a rotating body at a bottom portion of an apparatus main body provided with the transport unit and the processing portion therein and the medium transport apparatus is configured to be switchable between a movable state in which the rotating body contacts an installation surface on which the apparatus main body is installed and the apparatus main body is movable on the installation surface with the rotation of the rotating body and an installation state in which a contact area of the bottom portion with respect to the installation surface is larger than the movable state and the apparatus main body is installed on the installation surface to be used.

DESCRIPTION OF EXEMPLARY EMBODIMENTS

Hereinafter, the disclosure will be schematically described. According to a first aspect of the present disclosure, there is provided a medium transport apparatus including a transport unit that is provided in a transport path along which a medium is transported, and a processing portion that performs predetermined processing on the medium transported along the transport path, and the medium transport apparatus is configured to include a rotating body at a bottom portion of an apparatus main body provided with the transport unit and the processing portion therein and to be switchable between a movable state in which the rotating body contacts an installation surface on which the apparatus main body is installed and the apparatus main body is movable on the installation surface with the rotation of the rotating body and an installation state in which a contact area of the bottom portion with respect to the installation surface is larger than the movable state and the apparatus main body is installed and used on the installation surface.

According to this aspect, the medium transport apparatus is configured to include a rotating body at a bottom portion of an apparatus main body provided with the transport unit and the processing portion therein and to be switchable between a movable state in which the rotating body contacts an installation surface on which the apparatus main body is installed and the apparatus main body is movable on the installation surface with the rotation of the rotating body and an installation state in which a contact area of the bottom portion of the apparatus main body with respect to the installation surface is larger than the movable state and the apparatus main body is installed and used on the installation surface, thus it is possible to easily move the apparatus main body on the installation surface with a smaller force compared to lifting the apparatus main body completely.

In a second aspect of the medium transport apparatus according to a first aspect, the apparatus main body includes a discharge portion that discharges the medium processed by the processing portion, when a medium discharge direction by the discharge portion in the apparatus main body is front and an opposite direction thereof is rear, the rotating body is provided in a lower rear portion of the apparatus main body, the rotating body is separated from the installation surface in the installation state, and when the apparatus main body is tilted rearward to a tilted posture from the installed state, the rotating body contacts the installation surface and the apparatus main body switches to the movable state.

According to this aspect, the rotating body is separated from the installation surface in the installation state, the rotating body contacts the installation surface by tilting the apparatus main body rearward from the installed state, and the apparatus main body switches to the movable state, thus it is possible to for a user to easily move the apparatus main body by lifting the apparatus main body from the front.

A third aspect of the medium transport apparatus according to the second aspect, further includes a grip portion that is provided in front of the apparatus main body and is gripped by the user with his or her hand when changing a posture of the apparatus main body.

According to this aspect, there is provided a grip portion that is provided in front of the apparatus main body and the user is able to hold with his or her hand when changing a posture of the apparatus main body, thus it is possible to improve the operability when changing the posture of the apparatus main body.

A fourth aspect of the medium transport apparatus according to the third aspect, the apparatus main body includes a first part having the transport path therein, and a second part that supports the first part in a swingable manner and forms the bottom portion, and the rotating body and the grip portion are provided in the second part.

According to this aspect, in the medium transport apparatus having a configuration in which the apparatus main body includes a first part having the transport path therein, and a second part that supports the first part in a swingable manner and forms the bottom portion, it is possible to obtain the same effect as the third aspect. In addition, the first part can swing with respect to the second part, thus the posture of the first part during use of the device can be changed to a desired posture, and operability is improved.

A fifth aspect of the medium transport apparatus according to the fourth aspect, the rotating body and the grip portion are disposed with a center of gravity of the apparatus main body interposed therebetween in an apparatus front-rear direction.

According to this aspect, the rotating body and the grip portion are disposed with the center of gravity of the apparatus main body interposed therebetween in the apparatus front-rear direction, thus it is possible to easily tilt the apparatus main body rearward with less force than when the grip portion is provided at a position closer to the rotating body than the center of gravity.

A sixth aspect of the medium transport apparatus according to any one of the second to fifth aspect, the rotating body includes two rollers of a first roller and a second roller, and the first roller and the second roller are disposed with a central portion in an apparatus width direction intersecting with an apparatus front-rear direction interposed therebetween.

According to this aspect, the rotating body includes two rollers of a first roller and a second roller, and the first roller and the second roller are disposed with a central portion in an apparatus width direction intersecting with an apparatus front-rear direction interposed therebetween, thus it is possible to stably move the apparatus main body in the movable state.

A seventh aspect of the medium transport apparatus according to any one of the first to sixth aspect, further includes a detection portion that detects switching from the installation state to the movable state, an operation portion that receives an operation input, and a control portion that controls an operation of the medium transport apparatus based on an operation input result to the operation portion and a detection result by the detection portion, in which, when it is determined that a state of the apparatus is switched from the installation state to the movable state based on detection information of the detection portion, the control portion sets the operation portion to an input-prohibited state in which no operation input is received.

If the medium is transported by the transport unit while the apparatus is moving, the transport accuracy may be reduced, and if processing is performed by the processing portion while the apparatus is moving, there is a possibility that a desired processing result cannot be obtained. However, according to this aspect, when the control portion determines that the state of the apparatus is switched from the installation state to the movable state based on the detection information of the detection portion, the control portion sets the operation portion to an input-prohibited state in which no operation input is received, thus it is possible to avoid the above problem.

An eighth aspect of the medium transport apparatus includes the medium transport apparatus according to any one of the first to seventh aspect including a reading portion that reads an image on a medium, as the processing portion.

According to this aspect, in the image reading apparatus including the medium transport apparatus according to any one of the first to seventh aspect, and the reading portion that reads an image of the medium as the processing portion, it is possible to obtain the same effect as the first to seventh aspect.

First Embodiment

Figure 5:
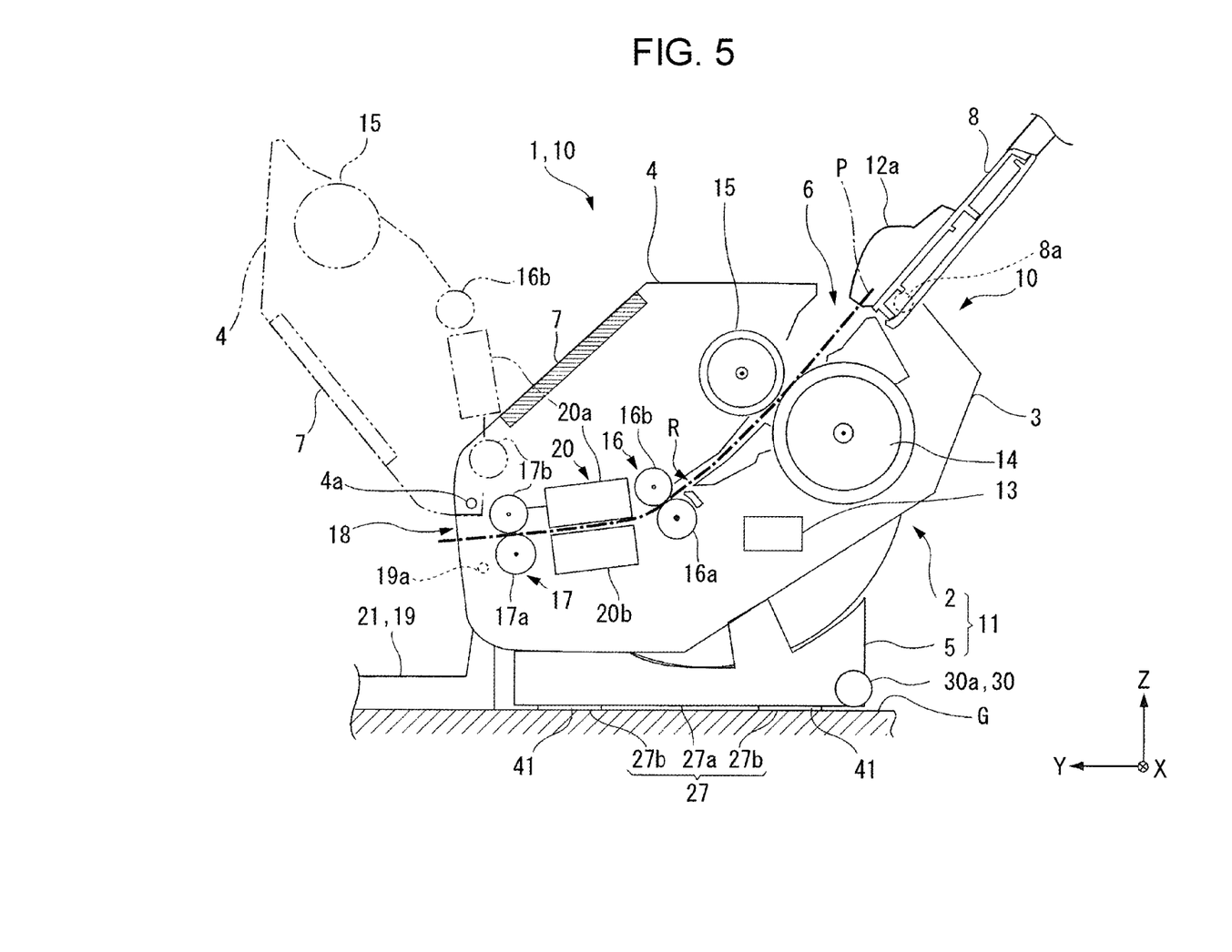
FIG. 5 is a side sectional view showing a transport path in the scanner.

First, an outline of a medium transport apparatus and an image reading apparatus according to an embodiment of the disclosure will be described with reference to drawings. In the present embodiment, as an example of the image reading apparatus, a scanner 1 shown in FIG. 1 that can read at least one of the front surface and the back surface of a medium is taken as an example. The scanner 1 is a so-called document scanner that reads an original such as a document. As shown in FIG. 5, the scanner 1 is configured to include the medium transport apparatus 10 including a feeding roller 14 as a transport unit provided in a transport path R along which a document P as a medium is transported, a transport roller pair 16, a discharge roller pair 17, and a reading portion 20 that performs predetermined processing and performs reading processing of reading the document P as the predetermined processing. The entire scanner 1 can also be regarded as a medium transport apparatus 10.

In an XYZ coordinate system shown in each drawing, an X direction is an apparatus width direction, a Y direction is an apparatus front-rear direction and an apparatus depth direction. A Z direction is the vertical direction and indicates the height direction. A +Y direction is the front of the apparatus, and a −Y direction is the rear of the apparatus. When viewed from the front of the apparatus, the left direction is a +X direction, and the right direction is a −X direction. A +Z direction is the upper side of the apparatus, and a −Z direction side is the lower side of the apparatus.

The direction in which the document P is transported is called "downstream", and the opposite direction is called "upstream".

Overview of Scanner

Hereinafter, the scanner 1 according to the disclosure will be described with reference to FIGS. 1 to 5. The scanner 1 includes an apparatus main body 11 including therein the feeding roller 14 as a transport unit, the transport roller pair 16 and the discharge roller pair 17 as shown in FIG. 5, and the reading portion 20 as a processing portion. A rotating body 30 is provided on a bottom portion 27 of the apparatus main body 11. The rotating body 30 which is a main part of the scanner 1 will be described in detail after the outline of the scanner and the transport path are described.

The apparatus main body 11 includes a casing 2 as a first part having the transport path R shown in FIG. 5 therein, and a support member 5 as a second part that supports the casing 2 in a swingable manner and forms the bottom portion 27 of the apparatus main body 11. The scanner 1 is installed on an installation surface G by bringing the bottom portion 27 of the apparatus main body 11 into contact with the installation surface G (see FIG. 5). As shown in FIG. 5, the scanner 1 is provided with a plurality of leg portions 41 on the support member 5 (see also FIG. 9). The bottom portion 27 of the apparatus main body 11 is a portion facing the installation surface G in the apparatus main body 11. In the embodiment, a lower surface 27a of the support member 5 and a lower surface 27b of the leg portion 41 constitute the bottom portion 27. When the scanner 1 is placed on the installation surface G, the leg portion 41 mainly contact the installation surface G. The scanner 1 can be configured not to include the leg portion 41, and in this case, the lower surface 27a of the support member 5 constitutes the bottom portion 27 and contacts the installation surface G.

The casing 2 is configured to swing around a swing shaft portion 26 (see FIG. 1) provided inside the casing 2. In addition to the case where the apparatus main body 11 is configured by the casing 2 (the first part) and the support member 5, the support member 5 (the second part) may not be provided, and the casing 2 itself may be installed on the installation surface G as the apparatus main body 11.

Figure 1:
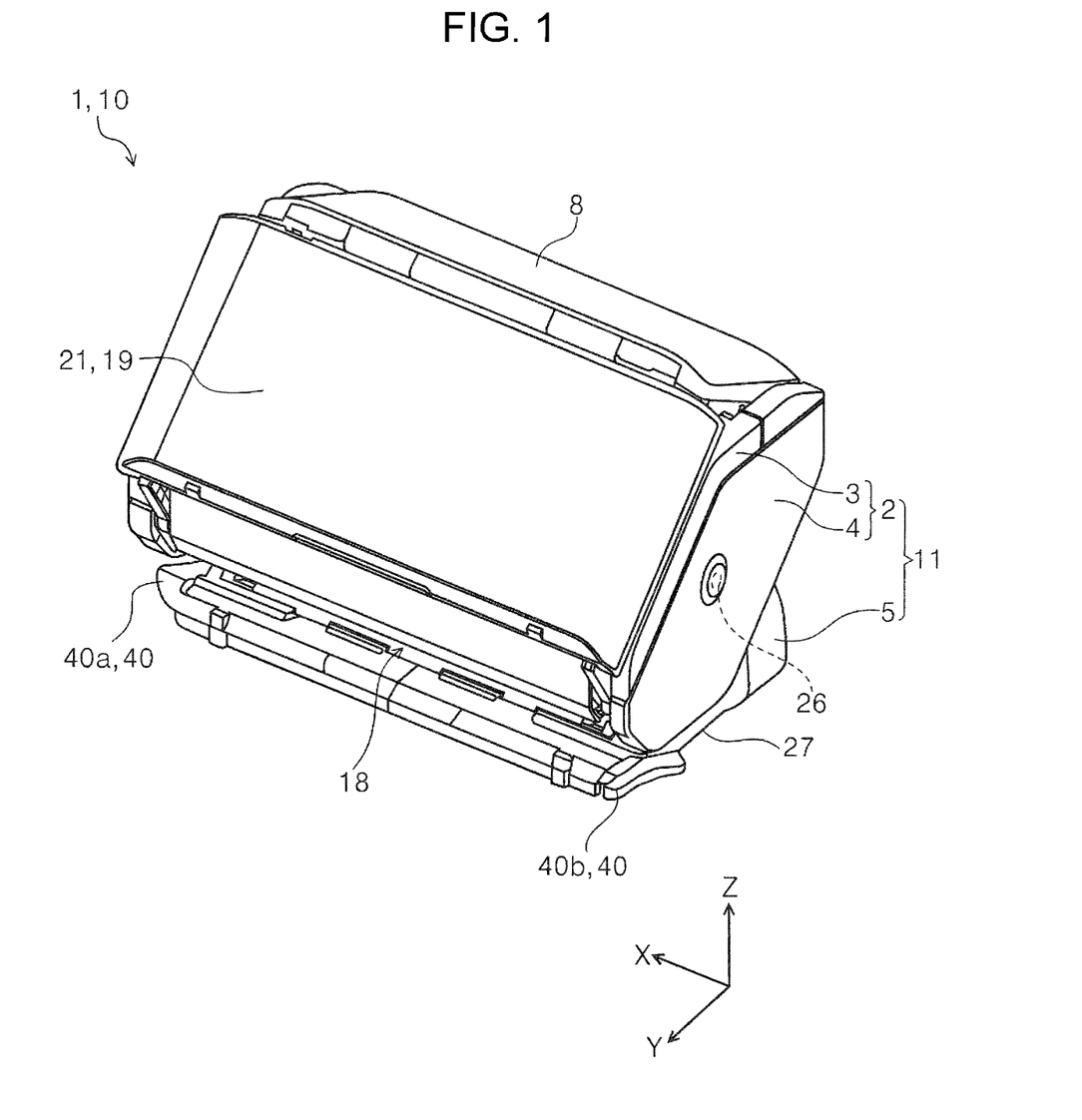
FIG. 1 is a perspective view of a scanner according to a first embodiment viewed from the front.

As shown in FIG. 1, the casing 2 includes a lower portion 3 that constitutes the lower portion of the casing 2 and an upper portion 4 that constitutes the upper portion of the casing 2. The upper portion 4 is rotated with respect to a rotation shaft 4a shown in FIG. 5 and is configured to be switchable between a closed state of covering the lower portion 3 as shown by a solid line in FIG. 5 and an open state of opening the lower portion 3 as shown by a two-dot chain line in FIG. 5. By opening the upper portion 4, the transport path R can be exposed and maintenance inside the casing 2 can be performed. The transport path R in the scanner 1 will be described in detail after the outline of the scanner 1 is described.

Figure 3:
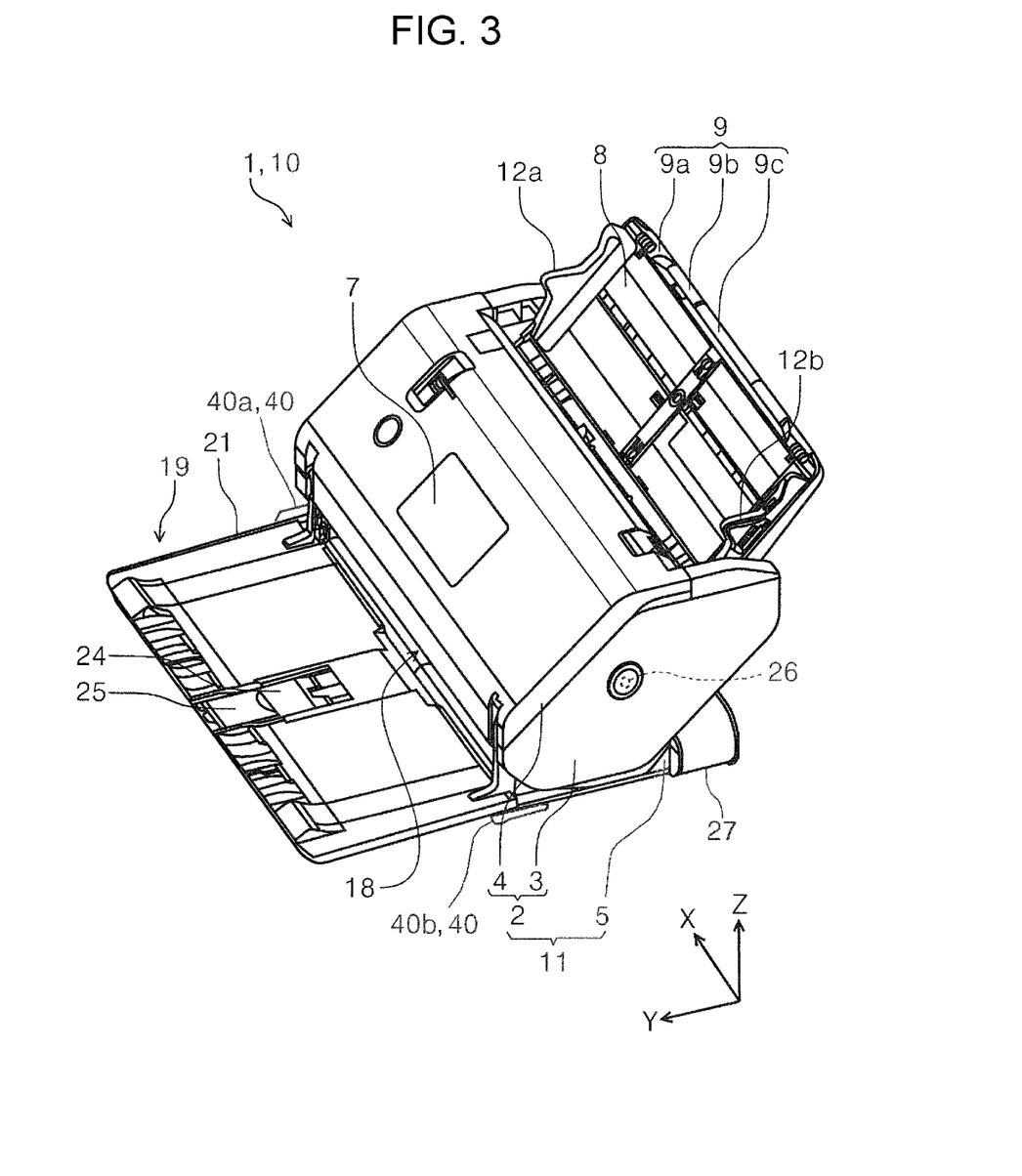
FIG. 3 is a perspective view of the scanner in which a paper discharging tray and a paper feeding tray are in an unfolded state.

As described above, the casing 2 is supported by the support member 5 to constitute the apparatus main body 11. As shown in FIG. 3, a supply portion 6 which is a supply port of the document P to the transport path R shown in FIG. 5 and a paper feeding tray 8 on which the document P fed from the supply portion 6 is mounted are provided at the upper rear portion of the casing 2. A plurality of cut sheets can be stacked and mounted as a bundle on the paper feeding tray 8 as the document P. A booklet such as a passport or a passbook can be set in the sheet paper feeding tray 8 as a document P in a sheet holder. The paper feeding tray 8 is provided so as to be rotatable with respect to the casing 2 around a rotation shaft 8a shown in FIG. 5.

In addition, a discharge portion 18 that discharges the document P after the reading processing by the reading portion 20 and a paper discharging tray 19 that receives the document P discharged from the discharge portion 18 are provided at the lower front portion of the casing 2 constituting the apparatus main body 11. In the scanner 1, the medium discharge direction by the discharge portion 18 provided in the apparatus main body 11 is the front, and the opposite direction is the rear. The paper discharging tray 19 is provided so as to be rotatable with respect to the casing 2 around a rotation shaft 19a shown in FIG. 5.

The scanner 1 is configured to be switchable between a housed state in which both the paper feeding tray 8 and the paper discharging tray 19 cover a part of the casing 2 as shown in FIG. 1 and an unfolded state in which the document P can be mounted on both the paper feeding tray 8 and the paper discharging tray 19 as shown in FIG. 3. When the scanner 1 is not in use, the apparatus can be made compact while being used as a cover for the casing 2 by placing the paper feeding tray 8 and the paper discharging tray 19 in the housed state.

Figure 6:
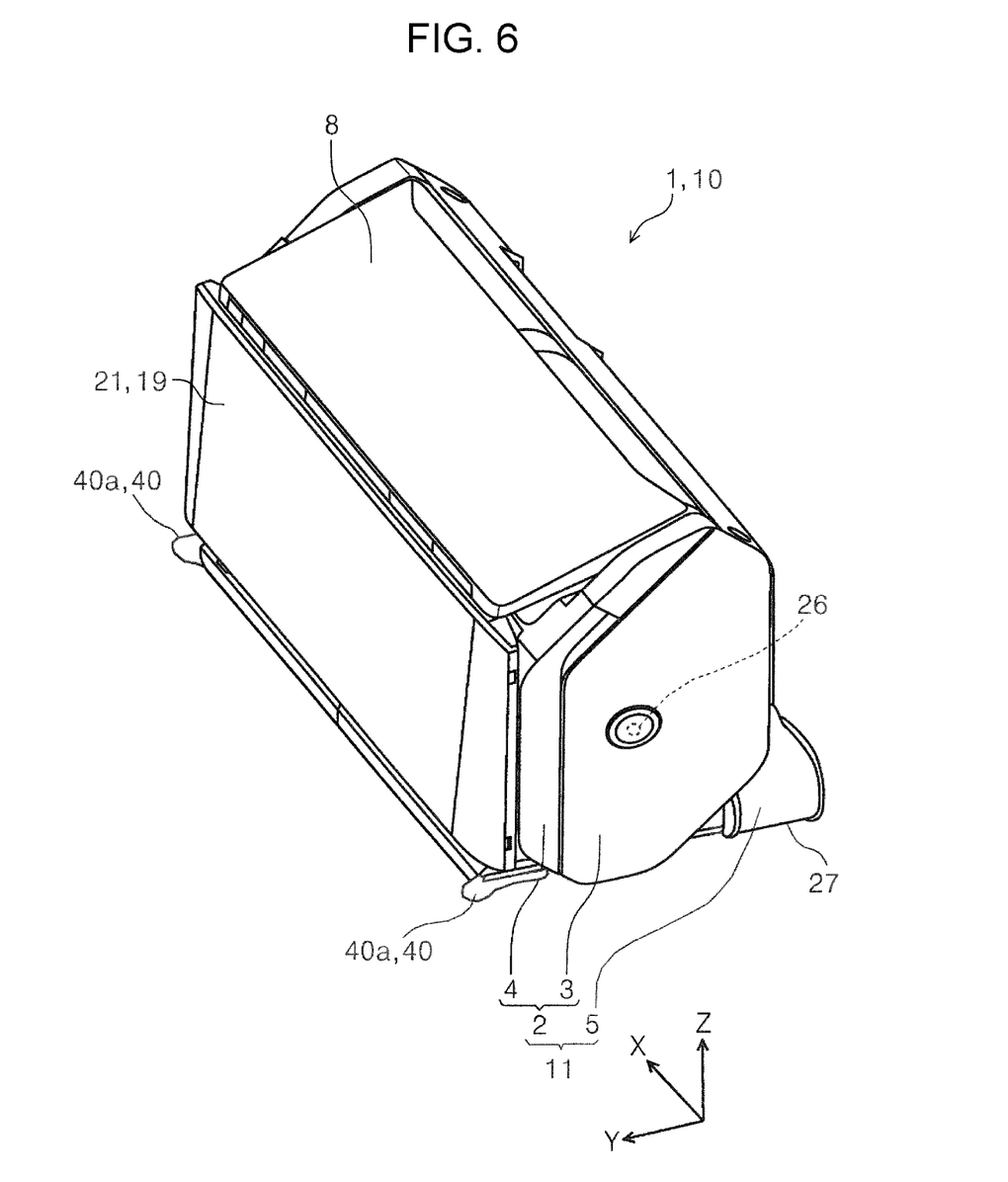
FIG. 6 is a perspective view of the scanner in which an angle of a casing with respect to a support member is different from that in FIG. 1.

The casing 2 is configured so that the support posture by the support member 5 can be changed from the posture shown in FIG. 1 to the posture shown in FIG. 6. In FIGS. 1 to 5, the casing 2 has the same posture, and the posture of the casing 2 in each of FIGS. 1 to 5 is a posture when the document P is transported and image reading by the reading portion 20 is executed. On the other hand, in FIG. 6, the casing 2 is supported by the support member 5 in a posture in which the discharge portion 18 located at the lower front portion in FIG. 1 faces downward. By setting the casing 2 in the posture shown in FIG. 6, the size in the Y-axis direction that is the front-rear direction of the scanner 1 can be made compact. It is possible to reduce the possibility of dust and the like entering the casing 2 from the discharge portion 18.

Although not shown in the drawing, it is also possible to execute image reading by swinging the casing 2 in a direction in which the medium discharge direction from the discharge portion 18 approaches horizontal compared to FIG. 1. In this way, the operability is improved by setting the posture of the casing 2 to a desired posture when the apparatus is used. The posture of the casing 2 is configured to be lockable at several positions by a posture locking unit (not shown), for example, and the posture of the casing 2 can be changed by releasing the posture locking unit. Of course, it is possible to change the posture of the casing 2 without steps. In the embodiment, the casing 2 is attached to the support member 5 in a swingable manner, but the casing 2 can also be fixed to the support member 5 in the posture shown in FIG. 1.

As shown in FIG. 3, the paper feeding tray 8 is provided with edge guides 12a and 12b that guide side edges in the width direction (X-axis direction) intersecting the medium transport direction of the document P. The edge guides 12a and 12b are provided to be slidable in the X-axis direction according to the size of the document P. In the embodiment, the edge guides 12a and 12b are configured so that the −X side edge guide 12b moves in the opposite direction following the X movement of the +X side edge guide 12a, by a known rack and pinion mechanism. In the paper feeding tray 8, the document P is aligned at the center in the width direction and is configured to be fed by a so-called center feeding method.

Figure 4:
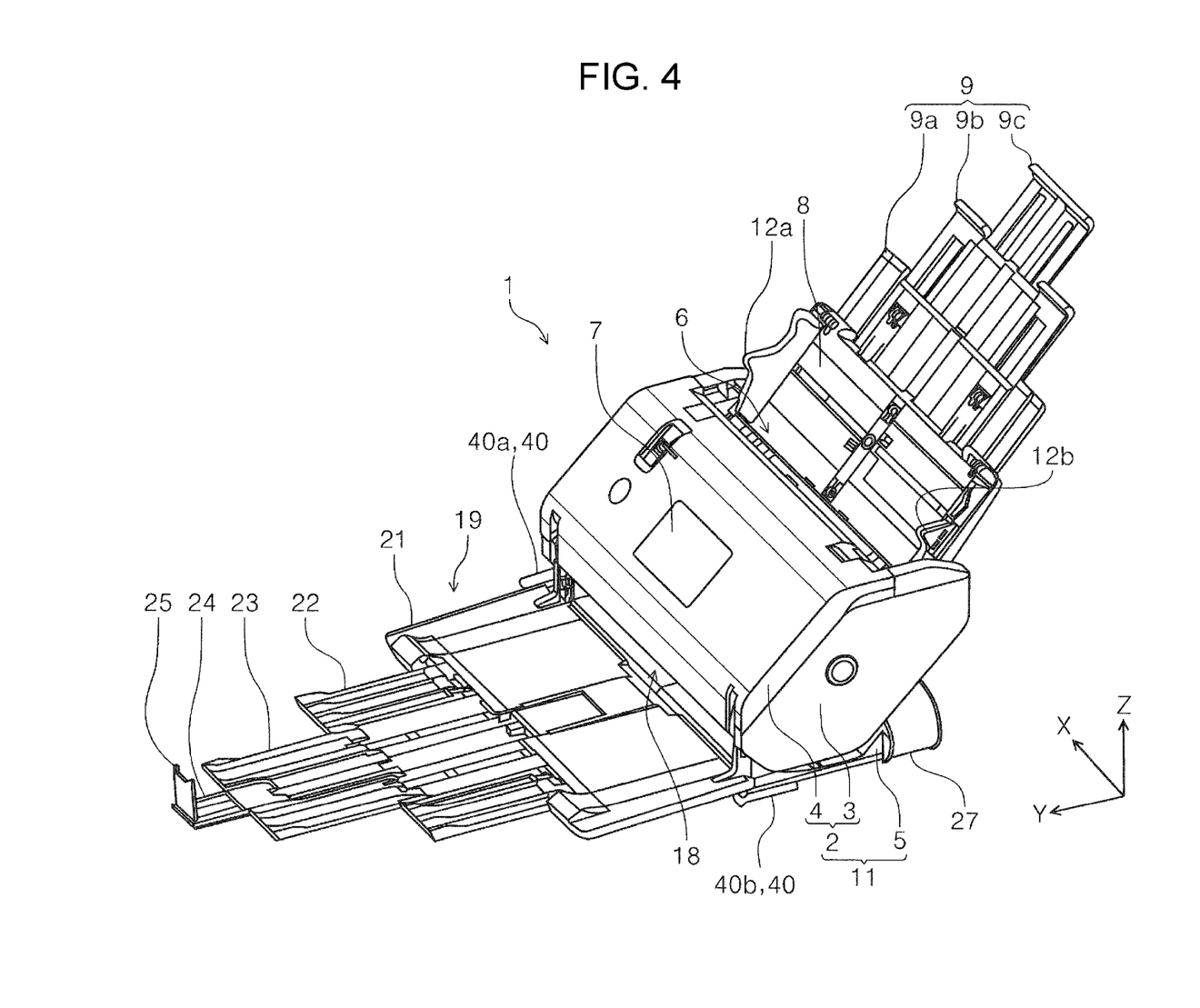
FIG. 4 is a perspective view of the scanner in a state in which an auxiliary paper discharging tray and an auxiliary paper feeding tray are pulled out from the state of the scanner shown in FIG. 3.

The paper feeding tray 8 includes an auxiliary paper feeding tray 9 that is switchable between a state pulled out from the paper feeding tray 8 as shown in FIG. 4 and a state housed in the paper feeding tray 8 as shown in FIG. 3. The auxiliary paper feeding tray 9 is configured by three trays, a first auxiliary paper feeding tray 9a, a second auxiliary paper feeding tray 9b, and a third auxiliary paper feeding tray 9c. When the auxiliary paper feeding tray 9 is pulled out as shown in FIG. 4, the length of the paper feeding tray 8 can be extended. As shown in FIG. 3, after the auxiliary paper feeding tray 9 is housed in the paper feeding tray 8, the paper feeding tray 8 can be brought into the housed state shown in FIG. 1.

As shown in FIG. 4, the paper discharging tray 19 includes a first tray 21 that receives the document P discharged from the discharge portion 18, and a second tray 22 that can be expanded and housed with respect to the first tray 21. The second tray 22 includes a third tray 23 that can be expanded and housed with respect to the second tray 22. The third tray 23 includes a fourth tray 24 that can be expanded and housed with respect to the third tray 23. The length of the paper discharging tray 19 in the medium discharge direction can be further extended by the second tray 22, the third tray 23, and the fourth tray 24. At the tip of the fourth tray 24, there is provided a restricting portion 25 that is formed so as to be foldable with respect to the fourth tray 24 and restricts the movement of the document P mounted on the paper discharging tray 19 in the +Y direction. After the second tray 22, the third tray 23, the fourth tray 24, and the restricting portion 25 are housed, the paper discharging tray 19 can be set to the housed state shown in FIG. 1.

As shown in FIGS. 3 and 4, the upper portion 4 is provided with an operation panel 7 as an operation portion that receives an operation input. The operation panel 7 can be configured as a touch panel as an example, and it is possible to perform operations such as various settings, reading, and the like in addition to displaying the contents related to the apparatus operation. Various operations in the scanner 1 are controlled by the control portion 13 shown in FIG. 5.

About Media Transport Path

Hereinafter, the configuration of the scanner 1 (medium transport apparatus 10) will be described in more detail while mainly describing the transport path R in the scanner 1 with reference to FIG. 5. A feeding roller 14, the transport roller pair 16, and the discharge roller pair 17 are disposed as transport unit in order from the upstream in the medium transport direction on the transport path R where the document P is supplied from the paper feeding tray 8. The feeding roller 14 feeds the medium from the paper feeding tray 8 on which the document P is mounted to the transport path R along which the document P is transported. The transport roller pair 16 is provided downstream of the feeding roller 14 in the medium transport direction and transports the document P. The discharge roller pair 17 is provided downstream of the reading portion 20 and discharges the document P after the reading processing by the reading portion 20.

Figure 7:
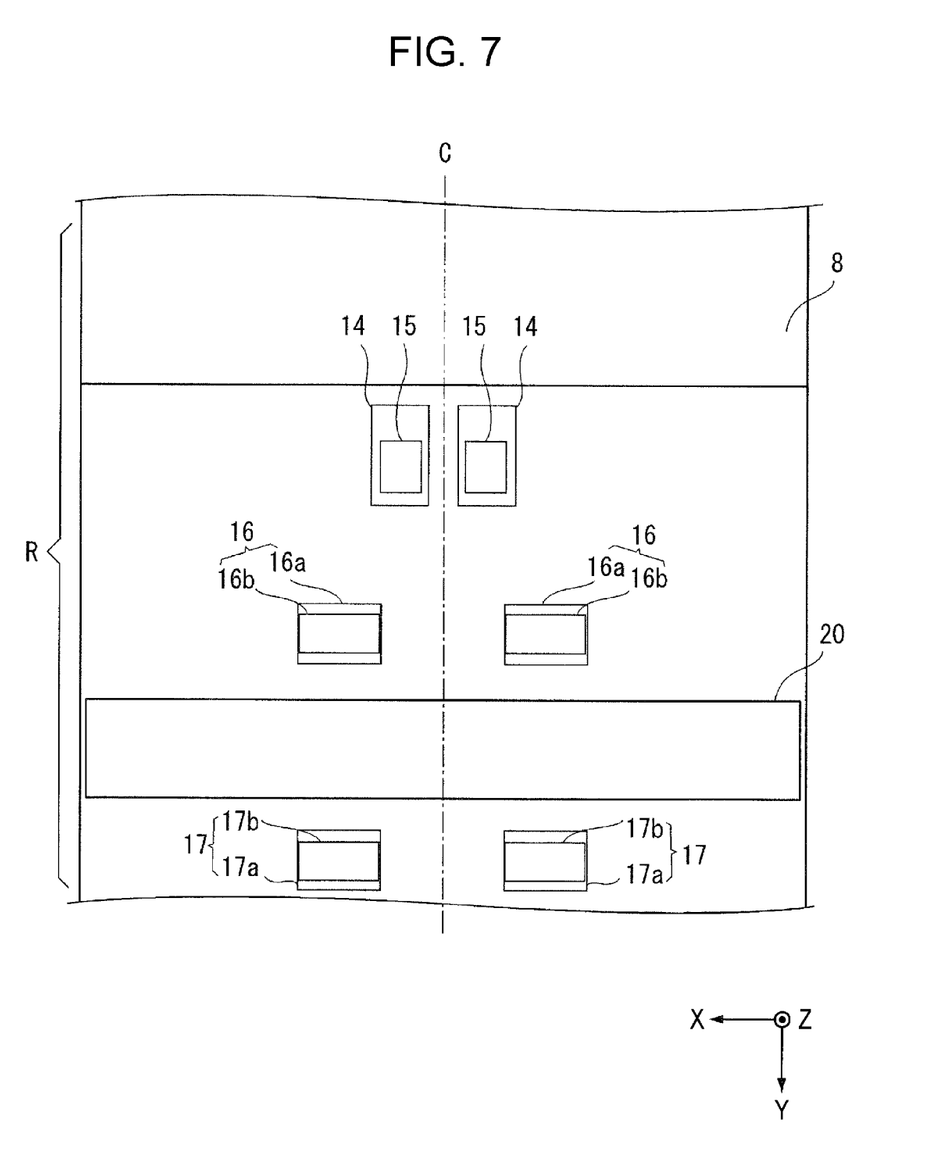
FIG. 7 is a plan view showing the transport path in the scanner.

In FIG. 5, a separation roller 15 that contacts the feeding roller 14 and separates the document P from the feeding roller 14 is provided at a position facing the feeding roller 14. As shown in FIG. 7, the feeding roller 14 and the separation roller 15 are disposed symmetrically at the both sides of a central portion C in the apparatus width direction.

The transport roller pair 16 includes a driving roller 16a driven by a driving source and a driven roller 16b that rotates following the rotation of the driving roller 16a. As shown in FIG. 7, the transport roller pair 16 is disposed symmetrically on both sides of the central portion C in the apparatus width direction.

The discharge roller pair 17 is a discharge unit that discharges the document P after being read by the reading portion 20 described later from the casing 2, and includes a discharge driving roller 17a and a discharge driven roller 17b that are driven by a drive source. As shown in FIG. 7, the discharge roller pair 17 is disposed symmetrically on both sides of the central portion C in the apparatus width direction.

The feeding roller 14, the driving roller 16a, and the discharge driving roller 17a are provided to be rotatable with respect to the lower portion 3. The separation roller 15, the driven roller 16b, and the discharge driven roller 17b provided at a position facing the feeding roller 14 are provided to be rotatable with respect to the upper portion 4.

The documents P mounted on the paper feeding tray 8 are picked up by the feeding roller 14, separated into a single sheet between the feeding roller 14 and the separation roller 15, and then sent toward the transport roller pair 16. Specifically, the document P is fed downstream by the feeding roller 14 rotating while contacting the surface of the document P facing the paper feeding tray 8, that is, the lower surface. Therefore, when a plurality of documents P are set on the paper feeding tray 8 in the scanner 1, the documents are fed downstream from the lower document P in order.

The document P fed by the feeding roller 14 is transported toward the reading portion 20 by the transport roller pair 16. The reading portion 20 includes a first reading unit 20a that is provided downstream of the transport roller pair 16 in the medium transport direction and reads a document P transported on the transport path R, and a second reading unit 20b that is provided to face the first reading unit 20a across the transport path R and reads the document P transported on the transport path R. As an example, the first reading unit 20a and the second reading unit 20b are configured as a contact image sensor module (CISM).

The first reading unit 20a is provided to be fixed to the lower portion 3. The second reading unit 20b is provided in the upper portion 4 and is configured to be displaceable in a direction in which the first reading unit 20a moves back and forth. As shown in FIG. 7, the first reading unit 20a and the second reading unit 20b are formed in a shape that is long in the apparatus width direction (X-axis direction). The first reading unit 20a reads the surface facing downward in the document P, and the second reading unit 20b reads the opposite surface, that is, the surface facing upward in the document P. After at least one surface of the document P is read by the reading portion 20, the document P is discharged from the discharge portion 18 by the discharge roller pair 17 located downstream of the reading portion 20.

In the embodiment, the feeding roller 14, the separation roller 15, the driving roller 16a, and the discharge driving roller 17a are rotationally driven by a driving source (not shown). These rollers can be configured to be driven by two or more driving sources in addition to the configuration driven by the same driving source. In the embodiment, as an example, the separation roller 15, the driving roller 16a, and the discharge driving roller 17a are driven by a common driving source, and the feeding roller 14 is driven by another driving source. In the scanner 1, operations related to image reading such as the operation of the transport unit and the operation of the reading portion 20 are controlled by the control portion 13.

About Rotating Body

Figure 2:
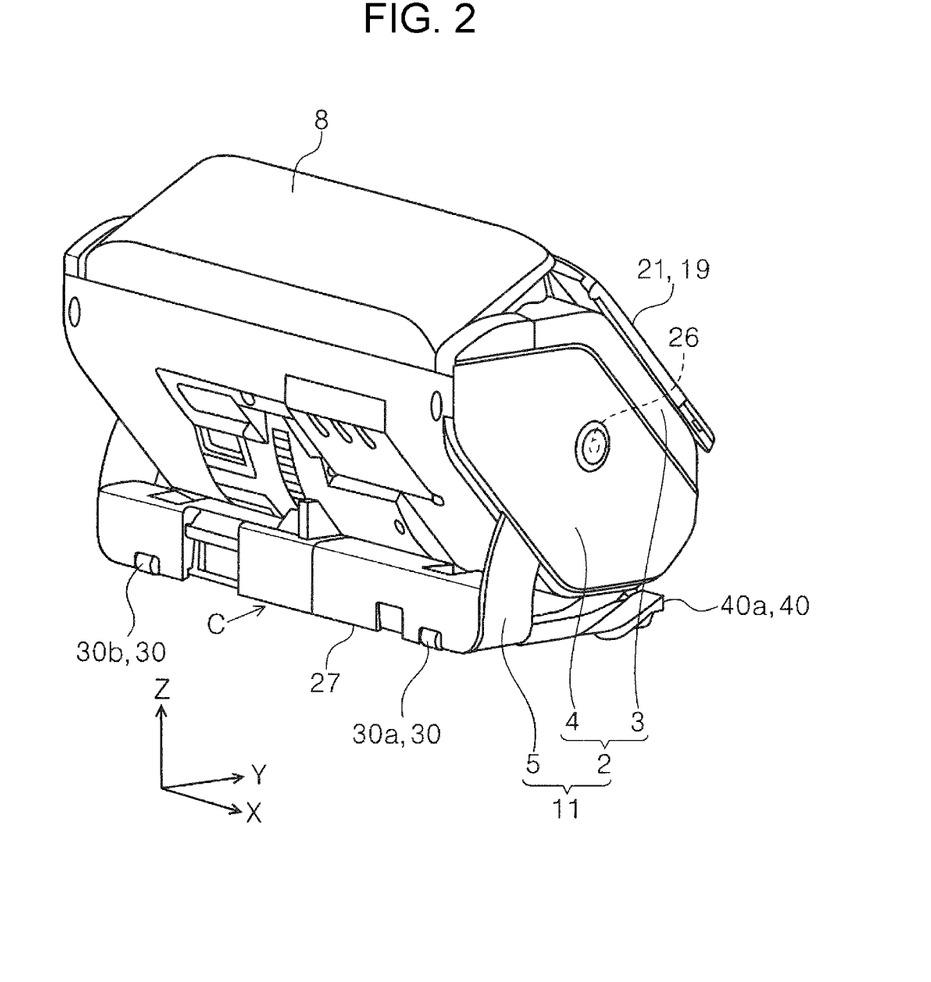
FIG. 2 is a perspective view of the scanner according to the first embodiment viewed from the rear.
Figure 9:
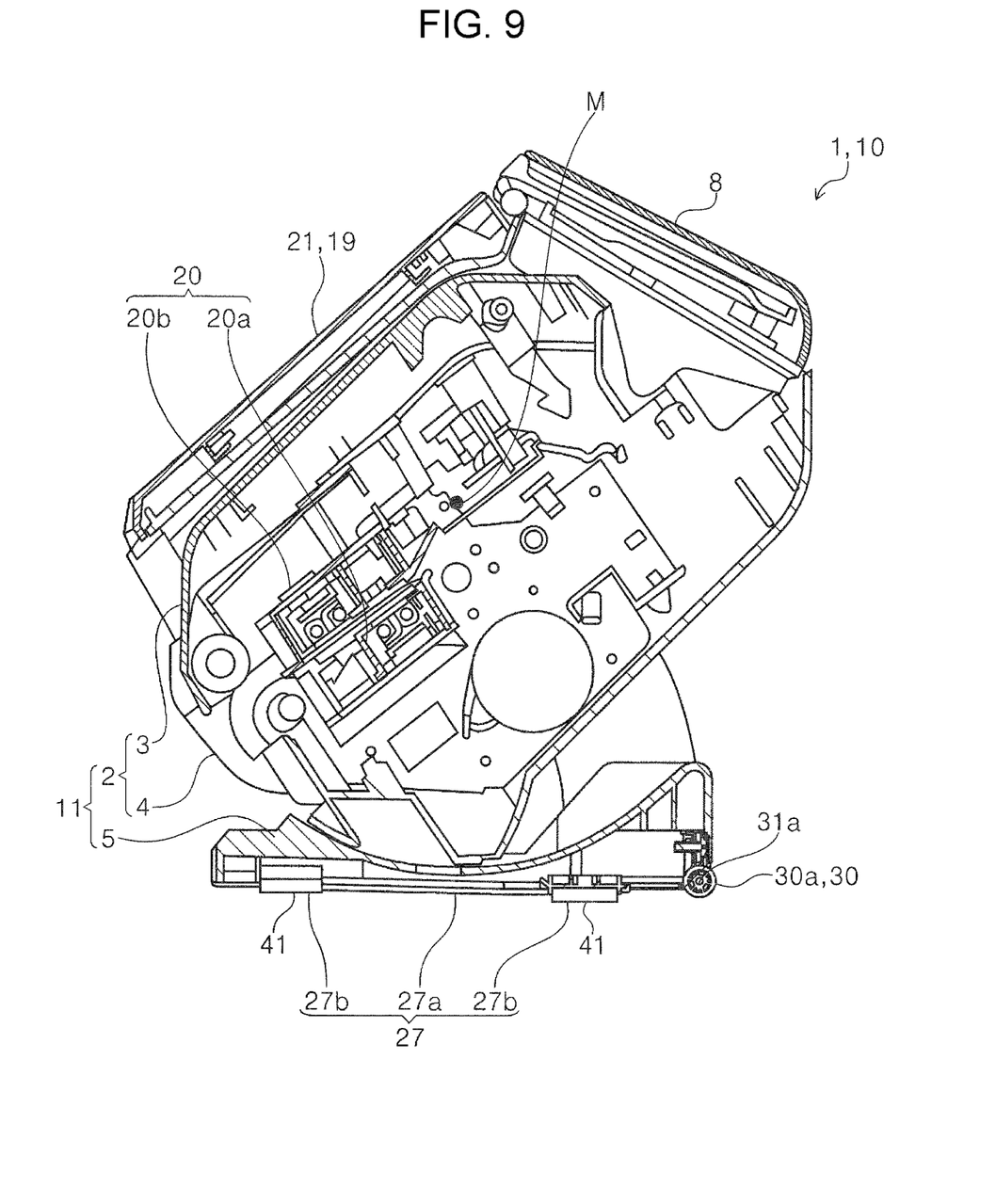
FIG. 9 is a side sectional view of the scanner shown in FIG. 1.
Figure 10:
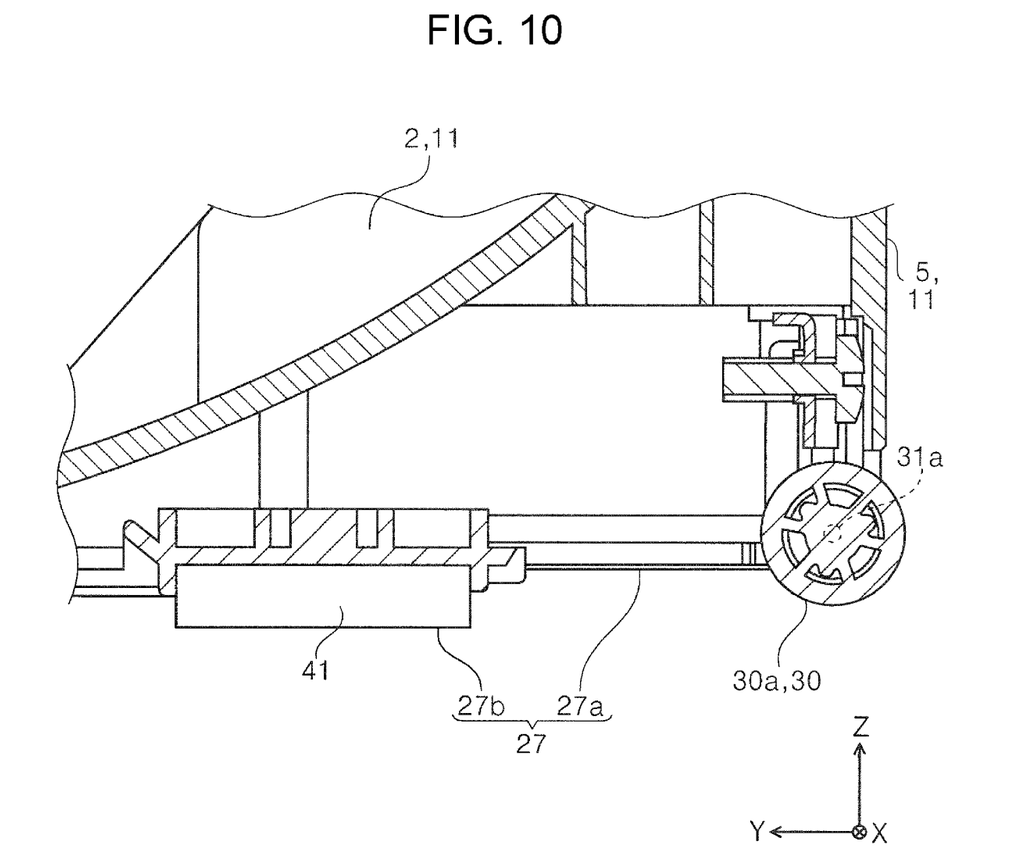
FIG. 10 is an enlarged view of a main part of FIG. 9.

The rotating body 30 provided on the bottom portion 27 of the apparatus main body 11 shown in FIG. 2 will be described. As shown in FIGS. 9 and 10, the rotating body 30 is provided at the lower rear portion of the apparatus main body 11, that is, at the lower rear portion of the support member 5. The rotating body 30 is configured to be rotatable with respect to a shaft portion 31 provided in the apparatus main body 11. As shown in FIG. 2, the rotating body 30 includes two rollers, a first roller 30a and a second roller 30b. In FIG. 2, the first roller 30a and the second roller 30b are disposed on both sides of the central portion C of the apparatus width direction (X-axis direction) intersecting the apparatus front-rear direction (Y-axis direction). More specifically, the first roller 30a and the second roller 30b are disposed symmetrically with respect to the central portion C in the apparatus width direction.

The first roller 30a and the second roller 30b can be formed with resin materials, such as a polyacetal (POM), as an example. In the following description, when there is no need to distinguish between the first roller 30a and the second roller 30b, the first roller 30a and the second roller 30b are collectively referred to as the rotating body 30.

Figure 8:
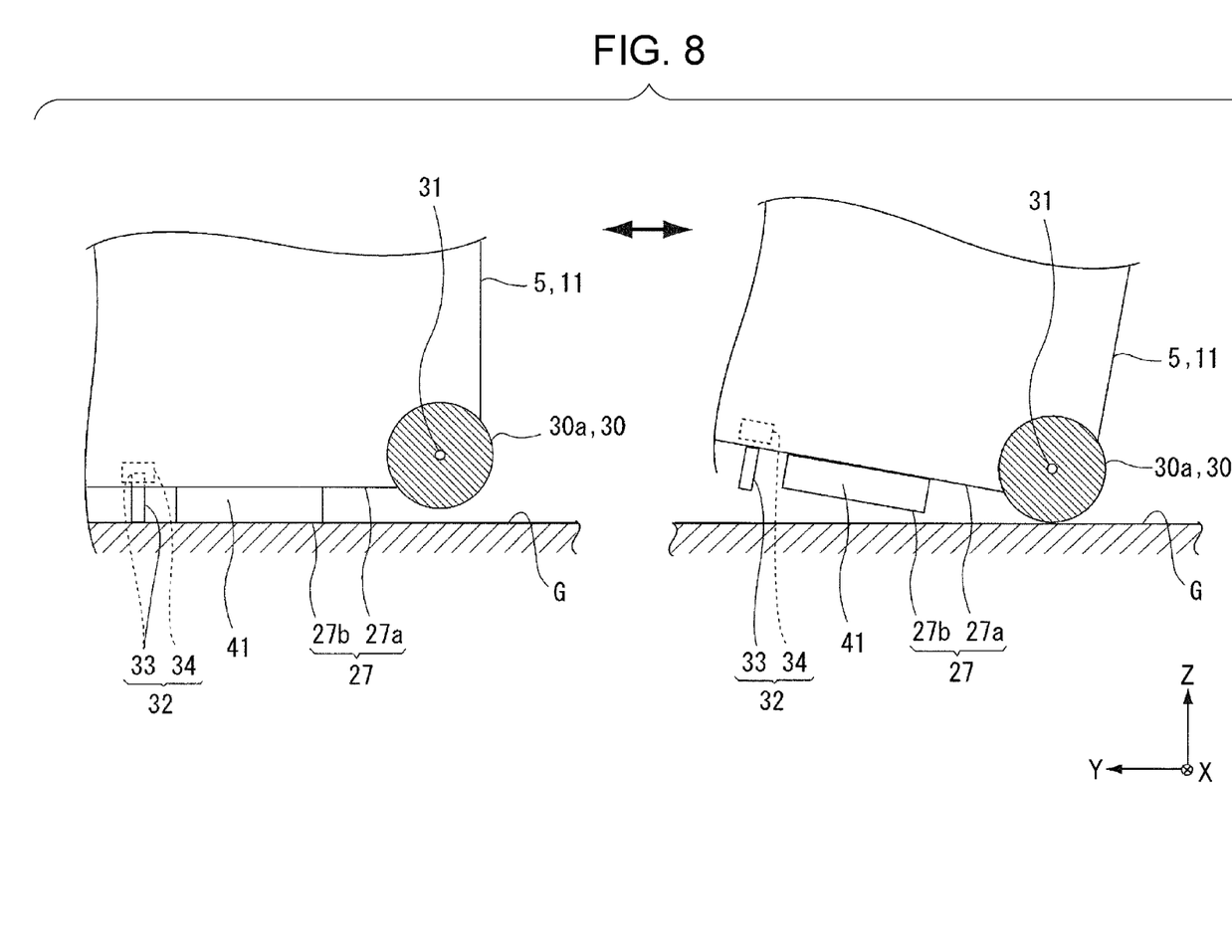
FIG. 8 is a view showing switching between an installation state of an apparatus main body and a movable state.

The scanner 1 is configured to be switchable between the movable state in which the rotating body contacts the installation surface G on which the apparatus main body 11 is installed and the rotation of the rotating body 30 enables the movement of the apparatus main body 11 on the installation surface G as shown in the right diagram of FIG. 8 and the installation state in which the contact area of the bottom portion 27 of the apparatus main body 11 with respect to the installation surface G is larger than the movable state and the apparatus main body 11 is installed and used on the installation surface G as shown in the left diagram of FIG. 8.

In the embodiment, the rotating body 30 is configured to be separated from the installation surface G in the installation state shown in the left diagram of FIG. 8 and contact the installation surface G by tilting the apparatus main body 11 rearward as shown in the right diagram of FIG. 8 from the installation state so that the apparatus main body 11 is switchable to the movable state.

Thus, the scanner 1 is configured to be switchable between the movable state shown in the right diagram of FIG. 8 and the installation state shown in the left diagram of FIG. 8, whereby the apparatus main body 11 can be easily moved on the installation surface G with less force than lifting the apparatus main body 11 completely.

Since the apparatus main body 11 is switched from the install state to the movable state by tilting the apparatus main body 11 rearward, a user can easily lift the apparatus main body 11 from the front and move the apparatus main body 11 in the front-rear direction of the apparatus.

The rotating body 30 is configured to include the first roller 30a and the second roller 30b that are spaced apart from each other with the central portion C (see FIG. 2) in the apparatus width direction interposed therebetween, whereby the apparatus main body 11 can be stably moved in the movable state (refer to the right diagram in FIG. 8). The rotating body 30 is not restricted to the configuration provided with two rollers of the first roller 30a and second roller 30b and can be configured to include at least one roller. It is desirable that at least one roller is disposed symmetrically with respect to the central portion C in the apparatus width direction. The rotating body 30 is not limited to a cylindrical roller, and for example, a ball roller can be used.

Other Configuration of Scanner

Figure 11:
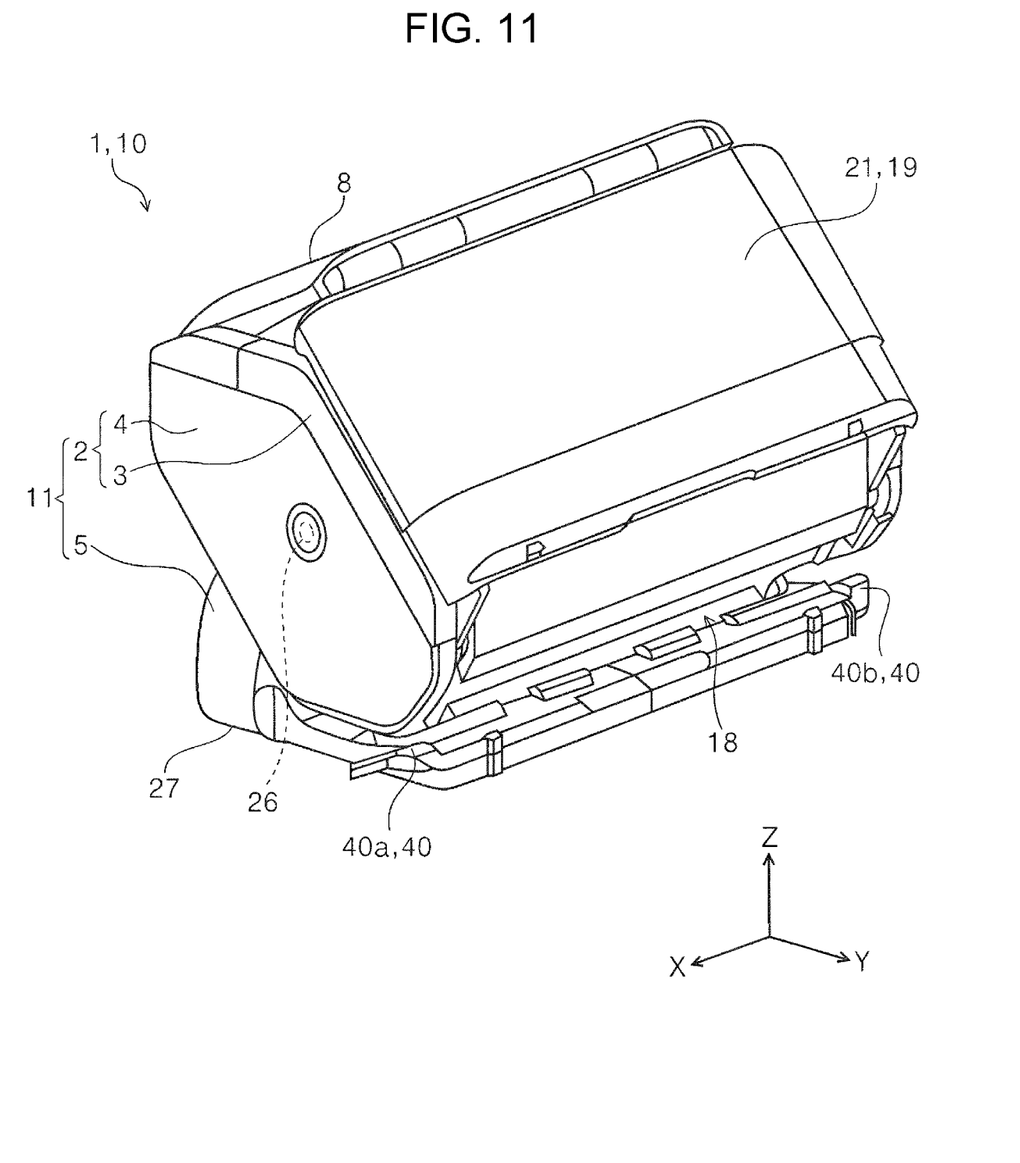
FIG. 11 is a perspective view of the scanner according to the first embodiment when viewed from an angle different from that of FIG. 1.

As shown in FIG. 1, a grip portion 40 is provided in front of the apparatus main body 11 and the user can hold with his or her hand when changing the posture of the apparatus main body 11. In the embodiment, the grip portion 40 is provided on the same support member 5 as the rotating body 30. The grip portion 40 includes a first grip portion 40a and a second grip portion 40b (see also FIG. 11) provided in front of the support member 5 and on both sides in the apparatus width direction. As shown in FIGS. 1 and 11, the first grip portion 40a and the second grip portion 40b are provided symmetrically. By providing the grip portion 40 in the scanner 1, operability when changing the posture of the apparatus main body 11 can be improved.

Figure 12:
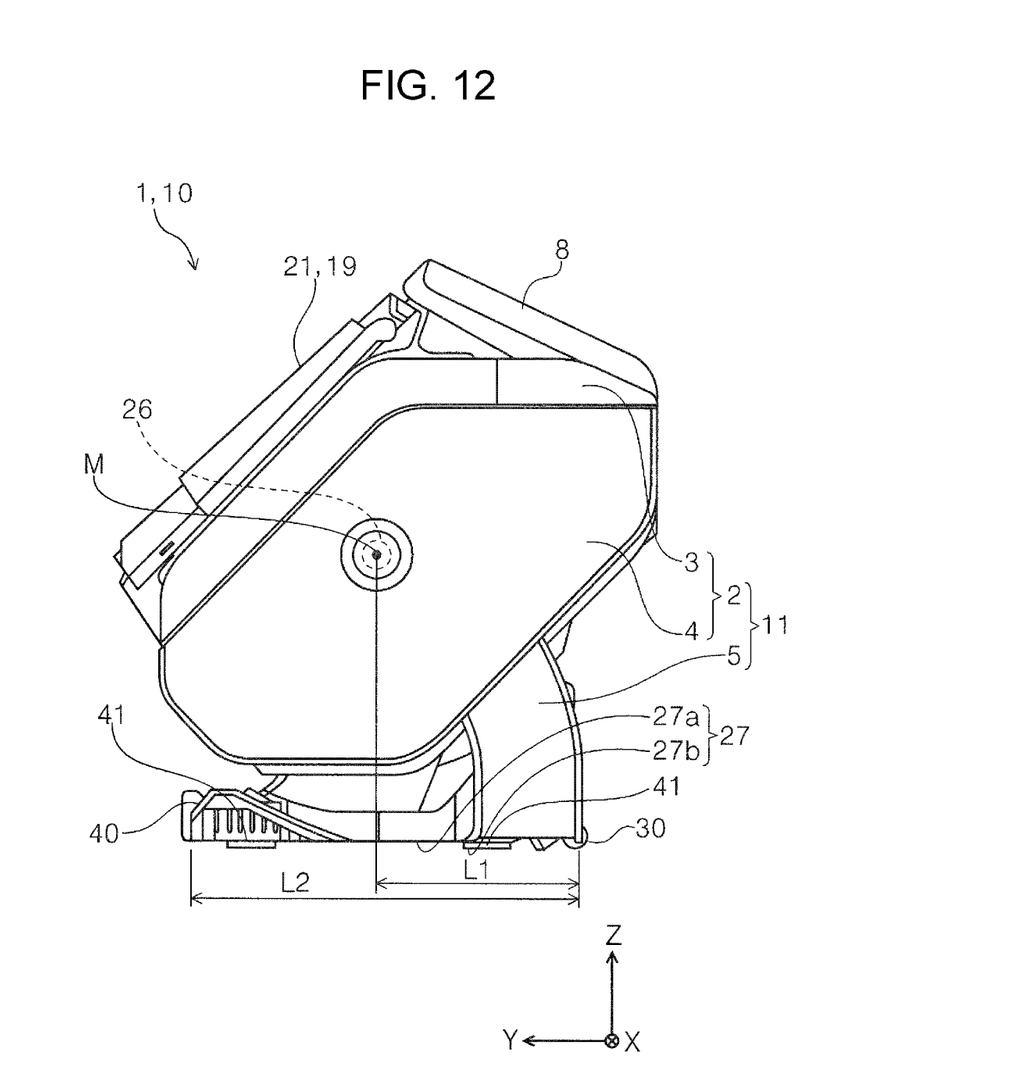
FIG. 12 is a side view of the scanner according to the first embodiment.

As shown in FIG. 12, the rotating body 30 and the grip portion 40 are disposed with the center of gravity M of the apparatus main body 11 interposed therebetween in the apparatus front-rear direction. In other words, the rotating body 30 and the grip portion 40 are disposed in the apparatus front-rear direction such that a distance L2 from the rotating body 30 to the grip portion 40 is longer than a distance L1 from the rotating body 30 to the center of gravity M of the apparatus main body 11.

The rotating body 30 and the grip portion 40 are disposed in such a relationship with respect to the center of gravity M of the apparatus main body 11 in the front-rear direction of the apparatus, whereby the apparatus main body 11 can be easily tilted rearward with less force compared with the case where the grip portion 40 is provided closer to the rotating body 30 than the center of gravity M of the apparatus main body 11. The center of gravity M of the apparatus main body 11 is substantially at the same position as the swing shaft portion 26 of the casing 2 that swings with respect to the support member 5 in a side view of the apparatus. Even if the casing 2 is swung in a direction in which the medium discharge direction from the discharge portion 18 approaches the horizontal direction and even if the casing 2 is swung with respect to the support member 5 so that the discharge portion 18 faces downward as shown in FIG. 6, the position of the center of gravity M does not vary greatly. Therefore, even when the posture of the casing 2 with respect to the support member 5 is changed, the relationship of the distance L2>the distance L1 does not change, and the apparatus main body 11 can be easily tilted rearward by having the grip portion 40.

As shown in FIG. 8, the scanner 1 can be provided with a detection portion 32 that can detect the switching from the installation state to the movable state. As an example, the detection portion 32 can be configured to include a detection lever 33 that can be displaced in a direction in which the detection lever 33 moves back and forth with respect to the lower surface 27a (bottom portion 27) of the support member 5, and a detection sensor 34 that detects the detection lever 33. The detection sensor 34 includes, for example, a light emitting portion that emits light and a light receiving portion that receives light emitted from the light emitting portion, and it is possible to use an optical sensor that detects the presence or absence of the detection lever 33 based on whether or not the light receiving portion receives light. The detection lever 33 is pressed downward by a pressing unit such as a spring (not shown) in a direction protruding from the lower surface 27a, that is, in the installation state of the apparatus main body 11.

In the installation state of the apparatus main body 11 shown in the left diagram of FIG. 8, the detection lever 33 retreats to the inside of the apparatus main body 11 (the support member 5) when the tip in the protruding direction contacts the installation surface G, and is detected by the detection sensor 34. As shown in the right drawing of FIG. 8, the apparatus main body 11 is switched to a movable state, the detection sensor 34 moves away from the installation surface G, the detection lever 33 is displaced in a direction protruding from the lower surface 27a by the pressing force of a pressing unit (not shown), and the detection lever 33 is not detected by the detection sensor 34. Based on the detection information of the detection portion 32 as described above, the control portion 13 that controls the operation of the scanner 1 can perform the following control.

That is, when it is determined that the state of the scanner 1 is switched from the installation state to the movable state based on the detection information of the detection portion 32, the control portion 13 sets the operation panel 7 as the operation portion into an input-prohibited state in which no operation input is received. In the embodiment, when the detection lever 33 of the detection portion 32 is switched from the state detected by the detection sensor 34 to the non-detection state, the control portion 13 determines that the state of the scanner 1 is switched from the installation state to the movable state.

If the document P is transported by the transport unit while the scanner 1 is moving, the transport accuracy may be reduced. If the reading processing is performed by the reading portion 20 while the scanner 1 is moving, good reading results may not be obtained. In the embodiment, when the control portion 13 determines that the state of the scanner 1 has been switched from the installation state to the movable state, the operation panel 7 is in the input-prohibited state, thus the above-described problem can be avoided. When the control portion 13 determines that the state of the scanner 1 has been switched from the installation state to the movable state, for example, the scanner 1 can be configured to enter a sleep state, a halt state, or a power-off state. In addition, with this configuration, it is possible to avoid problems caused by the document P being transported or being read while the apparatus is moving.

Modification Example of Scanner

The rotating body 30 is separated from the installation surface G in the installation state of the apparatus main body 11 shown in the left diagram of FIG. 8, but can also be configured to contact the installation surface G in the installation state of the apparatus main body 11. When the rotating body 30 contacts the installation surface G in the installation state of the apparatus main body 11, it is desirable that the rotating body 30 is disposed so that the rotation is restricted by the frictional resistance with the installation surface G.

The rotating body 30 shown in FIG. 8 is configured to be vertically displaceable, a displacement unit capable of displacing the rotating body 30 between a position away from the installation surface G and a position in contact with the installation surface G is provided, and the displacement unit switches between a state where the rotating body 30 does not contact the installation surface G and a state where the rotating body 30 contacts the installation surface G, whereby it is also possible to switches between the installation state and the movable state.

In FIG. 8, instead of displacing the rotating body 30 in the vertical direction, for example, the leg portion 41 can be configured to be movable back and forth with respect to the support member 5, and it is possible to provide a switching unit that is switchable between a state in which the rotating body 30 is separated from the installation surface G by the leg portion 41 protruding from the lower surface 27a of the support member 5 and a state in which the rotating body 30 contacts the installation surface G by retreating from the lower surface 27a so that the leg portion 41 is housed in the support member 5. By such a switching unit, the installation state and the movable state of the apparatus main body 11 can be switched.

The apparatus main body 11 can also be configured to be switched between the installation state and the movable state by providing the rotating body 30 not at the lower portion of the apparatus main body 11 at the rear of the apparatus but at the lower portion of the apparatus main body 11 at the front of the apparatus and tilting the apparatus main body 11 from the rear to the front. The apparatus main body 11 can also be configured to be switched between the installation state and the movable state by providing the rotating body 30 at the lower portion on either side of the apparatus main body 11 and tilting the apparatus main body 11 in either the left-right direction instead of the front-rear direction.

The medium transport apparatus 10 is not limited to the scanner 1 as an image reading apparatus, and for example, can also be employed for a recording apparatus that includes a recording portion that performs recording processing on a medium that is transported along a transport path as a processing portion that performs predetermined processing on the medium.

In addition, the disclosure is not limited to the embodiment described above, and various modifications are possible within the scope of the disclosure described in the claims, and it is needless to say that the modifications are also included in the scope of the disclosure.

What is claimed is:

1. A medium transport apparatus comprising:
    a transport unit that is provided in a transport path along which a medium is transported; and
    a processing portion that performs predetermined processing on the medium transported along the transport path,
    the medium transport apparatus includes a rotating body at a bottom portion of an apparatus main body provided with the transport unit and the processing portion therein,
    a grip portion that is provided in front of the apparatus main body and is gripped by a user with his or her hand when changing a posture of the apparatus main body,
    the apparatus main body includes a discharge portion that discharges the medium processed by the processing portion, and
    the medium transport apparatus is configured to be switchable between a movable state in which the rotating body contacts an installation surface on which the apparatus main body is installed and the apparatus main body is movable on the installation surface with the rotation of the rotating body and an installation state in which a contact area of the bottom portion with respect to the installation surface is larger than the movable state and the apparatus main body is installed on the installation surface to be used,
    wherein the rotating body is separated from the installation surface in the installation state,
    wherein when a medium discharge direction by the discharge portion in the apparatus main body is front and an opposite direction thereof is rear, the rotating body is provided in a lower rear portion of the apparatus main body,
    wherein when the apparatus main body is tilted rearward to a tilted posture from the installed state, the rotating body contacts the installation surface, and the apparatus main body switches to the movable state, and
    wherein the apparatus main body includes a first part having the transport path therein, and a second part that supports the first part in a swingable manner and forms the bottom portion, and the rotating body and the grip portion are provided in the second part.

2. The medium transport apparatus according to claim 1, wherein
the rotating body and the grip portion are disposed with a center of gravity of the apparatus main body interposed therebetween in an apparatus front-rear direction.

3. The medium transport apparatus according to claim 1, wherein
the rotating body includes two rollers of a first roller and a second roller, and
the first roller and the second roller are disposed with a central portion in an apparatus width direction intersecting with an apparatus front-rear direction interposed therebetween.

4. The medium transport apparatus according to claim 1, further comprising:
a detection portion that detects switching from the installation state to the movable state;
an operation portion that receives an operation input; and
a control portion that controls an operation of the medium transport apparatus based on an operation input result to the operation portion and a detection result by the detection portion, wherein
when it is determined that a state of the apparatus is switched from the installation state to the movable state based on detection information of the detection portion, the control portion sets the operation portion to an input-prohibited state in which no operation input is received.

5. An image reading apparatus comprising:
the medium transport apparatus according to claim 1 including a reading portion that reads an image on a medium, as the processing portion.

6. A medium transport apparatus comprising:
a transport unit that is provided in a transport path along which a medium is transported; and
a processing portion that performs predetermined processing on the medium transported along the transport path,
the medium transport apparatus includes a rotating body at a bottom portion of an apparatus main body provided with the transport unit and the processing portion therein, wherein
the apparatus main body includes a discharge portion that discharges the medium processed by the processing portion,
when a medium discharge direction by the discharge portion in the apparatus main body is front and an opposite direction thereof is rear, the rotating body is provided in a lower rear portion of the apparatus main body, wherein
the rotating body includes two rollers of a first roller and a second roller, and
the first roller and the second roller are disposed with a central portion in an apparatus width direction intersecting with an apparatus front-rear direction interposed therebetween, when the apparatus main body is tilted rearward to a tilted posture from the installed state, the rotating body contacts the installation surface, and the apparatus main body switches to the movable state; and the medium transport apparatus is configured to be switchable between a movable state in which the rotating body contacts an installation surface on which the apparatus main body is installed and the apparatus main body is movable on the installation surface with the rotation of the rotating body and an installation state in which a contact area of the bottom portion with respect to the installation surface is larger than the movable state and the apparatus main body is installed on the installation surface to be used, wherein the rotating body is separated from the installation surface in the installation state.

7. A medium transport apparatus comprising:

a transport unit that is provided in a transport path along which a medium is transported;

a processing portion that performs predetermined processing on the medium transported along the transport path, the medium transport apparatus includes a rotating body at a bottom portion of an apparatus main body provided with the transport unit and the processing portion therein and the medium transport apparatus is configured to be switchable between a movable state in which the rotating body contacts an installation surface on which the apparatus main body is installed and the apparatus main body is movable on the installation surface with the rotation of the rotating body and an installation state in which a contact area of the bottom portion with respect to the installation surface is larger than the movable state and the apparatus main body is installed on the installation surface to be used, wherein the rotating body is separated from the installation surface in the installation state;

a detection portion that detects switching from the installation state to the movable state;

an operation portion that receives an operation input; and a control portion that controls an operation of the medium transport apparatus based on an operation input result to the operation portion and a detection result by the detection portion, wherein when it is determined that a state of the apparatus is switched from the installation state to the movable state based on detection information of the detection portion, the control portion sets the operation portion to an input-prohibited state in which no operation input is received.

* * * * *